United States Patent [19]

Stenkvist

[11] Patent Number: 5,134,628
[45] Date of Patent: Jul. 28, 1992

[54] DIRECT-CURRENT ARC FURNACE HAVING BOTTOM ELECTRODES WITH BATH AGITATION ELECTROMAGNET

[75] Inventor: Sven-Einar Stenkvist, Brugg, Switzerland

[73] Assignee: ASEA Brown Boveri Ltd., Baden, Switzerland

[21] Appl. No.: 687,736

[22] Filed: Apr. 19, 1991

[30] Foreign Application Priority Data

May 9, 1990 [CH] Switzerland ............ 1578/90

[51] Int. Cl.$^5$ ............................................ H05B 7/144
[52] U.S. Cl. .................................. 373/107; 373/47; 373/72; 373/108; 373/153; 164/468
[58] Field of Search ............... 373/107, 108, 102, 103, 373/104, 105, 106, 72, 47, 12, 18, 153, 155; 164/52, 468

[56] References Cited

U.S. PATENT DOCUMENTS

| | | | |
|---|---|---|---|
| 2,727,936 | 12/1955 | Boyer | 373/107 |
| 3,949,151 | 4/1976 | Kerton | 373/107 |
| 4,032,704 | 6/1977 | Stenkvist | 373/104 |
| 4,228,314 | 10/1980 | Stenkvist | 373/106 |
| 4,495,625 | 1/1985 | Heberlein et al. | 373/107 |

FOREIGN PATENT DOCUMENTS

| | | |
|---|---|---|
| 0058817 | 9/1982 | European Pat. Off. . |
| 0133925 | 3/1985 | European Pat. Off. . |
| 1053690 | 3/1959 | Fed. Rep. of Germany . |
| 1458942 | 9/1969 | Fed. Rep. of Germany ...... 373/107 |
| 3022566 | 1/1981 | Fed. Rep. of Germany . |
| 0446355 | 12/1912 | France ................. 373/107 |
| 1422830 | 11/1965 | France . |
| 1313891 | 12/1989 | Japan ................. 373/108 |

Primary Examiner—Bruce A. Reynolds
Assistant Examiner—Tu Hoang
Attorney, Agent, or Firm—Oblon, Spivak, McClelland, Maier & Neustadt

[57] ABSTRACT

In a direct-current arc furnace having a bottom electrode (2), electromagnetically and/or chemically induced bath agitations are substantially eliminated by an electromagnet (9) arranged under the vessel bottom (7). In this way the stability of the bottom electrode (2) is considerably increased. The electromagnet (9) is preferably integrated into the electrical supply of the furnace and serves as a smoothing choke.

6 Claims, 3 Drawing Sheets

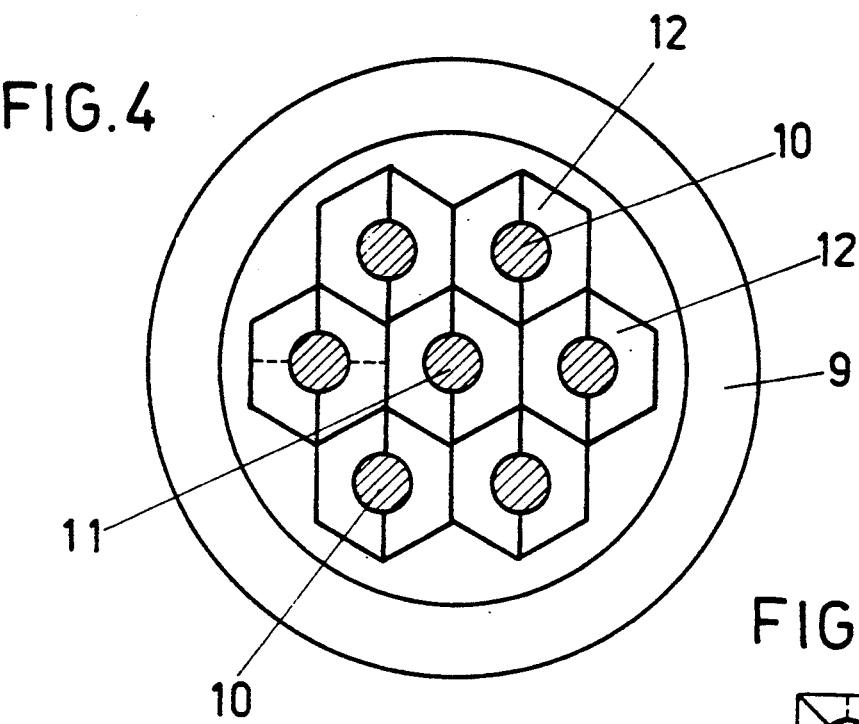
FIG.4
FIG.4a
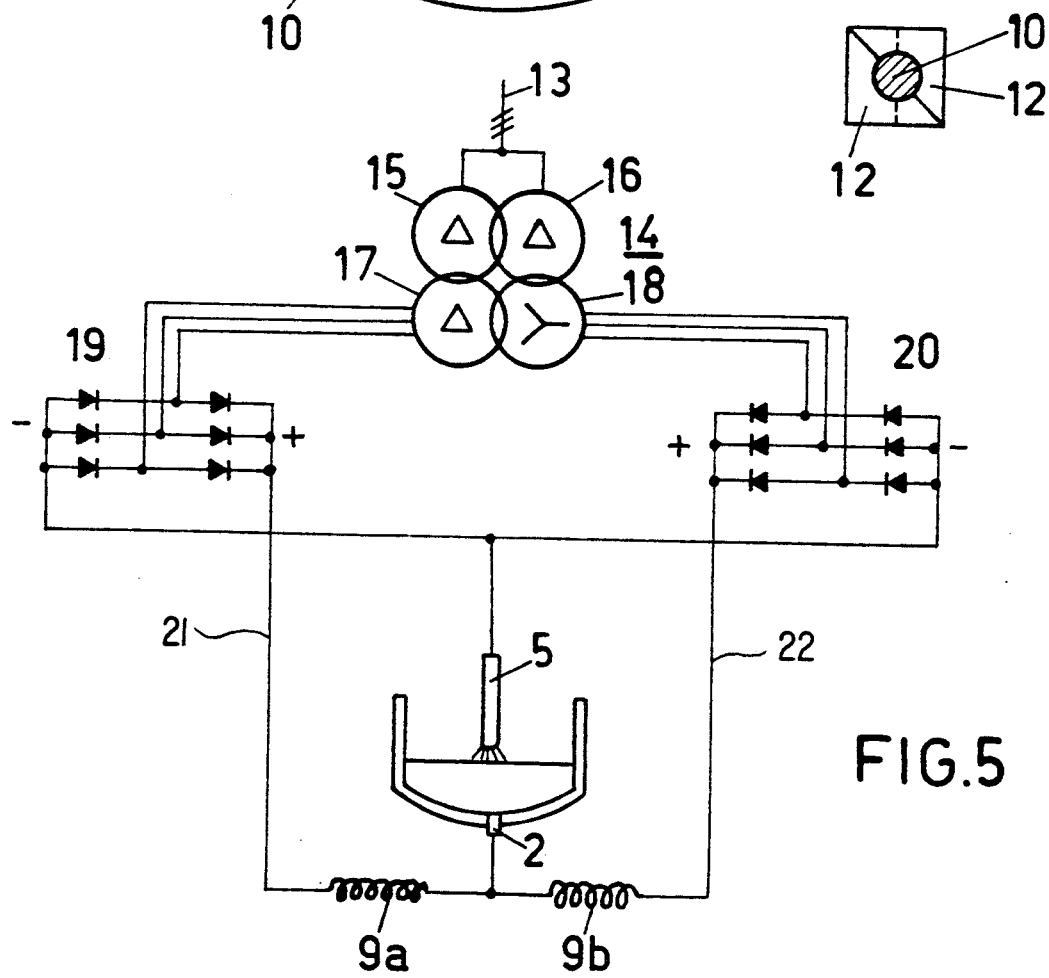
FIG.5

DIRECT-CURRENT ARC FURNACE HAVING BOTTOM ELECTRODES WITH BATH AGITATION ELECTROMAGNET

TECHNICAL FIELD

The invention relates to a direct-current arc furnace having at least one bottom electrode and means for producing a bath agitation by means of an electromagnet through which essentially direct current is passed.

In this connection, the invention makes reference to a prior art as revealed, for example, in U.S. Pat. No. 4,032,704.

TECHNOLOGICAL BACKGROUND AND PRIOR ART

In direct-current arc furnaces the bottom electrode is the most highly stressed component. In the simplest case it consists of a steel body which extends through the vessel bottom and its lining and makes the electrical contact with the melt in the interior of the furnace. The bottom electrode is connected to the current supply of the furnace outside the vessel bottom.

When the furnace is in operation, the bottom electrode melts to a certain depth. This melt mixes with that of the furnace. The depth to which the bottom electrode melts off depends on various factors:

on the magnitude of the Joule effect, which is produced by the passage of current through the bottom electrode;

on the heat flow from the melt to the bottom electrode;

on the degree of cooling of the bottom electrodes.

In order to ensure reliable operation of the furnace, the consumption of the bottom contact must be restricted. The heating-up due to the Joule effect can be controlled by dimensioning the bottom electrode for a suitable current density. In contrast, the heat flow from the melt to the bottom electrode is of a complex nature, two mechanisms being superimposed:

The furnace current passing through the melt and the molten part of the bottom contact leads to a bath agitation (electromagnetic stirring), which promotes heat exchange. Superimposed on this bath agitation is a process which in the relevant literature is referred to as chemical boiling and which is caused by the liberation of carbon monoxide from the molten part of the bottom contact. This "boiling", which occurs in particular in melts into which oxygen is blown in order to reduce the carbon content, leads to an intensive heat exchange with the bottom electrode and may cause the consumption of the bottom electrode to below the permissible value.

By means of a suitable cross-section of the bottom electrode and cooling measures, the bath agitation due to electromagnetic interactions can be controlled and thus the consumption restricted. Up to now the only measure to restrict the damaging effects of chemical boiling consists in dividing up the bottom electrode into a multiplicity of thin metal rods, which are all embedded in refractory material of the vessel bottom (cf. EP-A-0,058,817). The bridges made of refractory material which remain on consumption of the metal rods hinder the bath agitation in the region of the bottom electrode and consequently prevent excessive consumption of the metal rods. Bottom electrodes of this type are, however, very uneconomical in particular for large arc furnaces.

BRIEF DESCRIPTION OF THE INVENTION

Starting from the prior art, the object on which the invention is based is to provide a direct-current arc furnace, the bottom electrode of which has a simple and economical design and in which the consumption of the bottom electrode can be controlled in a simple way.

This object is achieved according to the invention by the fact that the electromagnet is arranged directly on the underside of the furnace vessel and encloses the bottom electrode(s), such that the latter form the iron core of the electromagnet.

In this way, the magnet produces a stationary magnetic field in the direction of the longitudinal axis of the bottom electrode. This field damps all bath agitations in the melt above the solid part of the bottom electrode. In this arrangement, the solid portion of the bottom electrode acts as an iron core and strengthens the field strength of the magnetic field wherever it is required. Field strengths ranging from 0.05 to 0.2 tesla have proved sufficient to damp the bath agitation above the solid part of the bottom electrode.

These electromagnets can be provided without great expenditure both in new constructions and in existing furnaces. Their additional power requirement is low compared with the power requirement of the entire furnace and is approximately 0.3% of the total furnace power.

In direct-current arc furnace plants direct-current chokes are normally employed in the supply equipment, so that the entire furnace control functions. Thus, for example, in a 12-pulse-rectifier two chokes are required, each having five turns, through which typically approximately 40 kA are passed. Now, the coil arrangements on the underside of the furnace vessel can advantageously be used as these very chokes, which can be effected, for example, by subdividing one coil into two coils connected magnetically in parallel.

Moreover, the coil arrangement has a still further positive effect on the direct-current arc furnace. The magnetic field penetrates not only the consumed part of the bottom electrode, but penetrates as far as the central and upper zone of the melt. There it interacts with the arc current in the melt and leads to a bath agitation around the melting electrode. This bath agitation in turn helps to produce good mixing of the melt in a region near the surface and consequently temperature equlisation.

In U.S. Pat. No. 4,032,704 it has already been proposed to provide an electromagnet supplied with direct current on the underside of the furnace vessel of a direct-current arc furnace. This electromagnet however serves expressly to produce an additional stirring motion in the melt in order to accelerate metallurgical reactions of a fluid blown into the melt with the melt.

The invention is explained in greater detail below with the aid of an exemplary embodiment illustrated in the drawings.

BRIEF DESCRIPTION OF THE DRAWINGS

In the drawing,

FIG. 4 shows a modification of FIG. 3 having individual electrodes which are placed in shaped bodies made of refractory material;

FIG. 4a shows a modification of electrodes of FIG. 4 in a square cross section.

FIG. 5 shows a circuit arrangement having a 12-pulse rectifier, in which arrangement the electromagnets are integrated into the furnace supply.

DETAILED DESCRIPTION OF THE INVENTION

Figure 1:
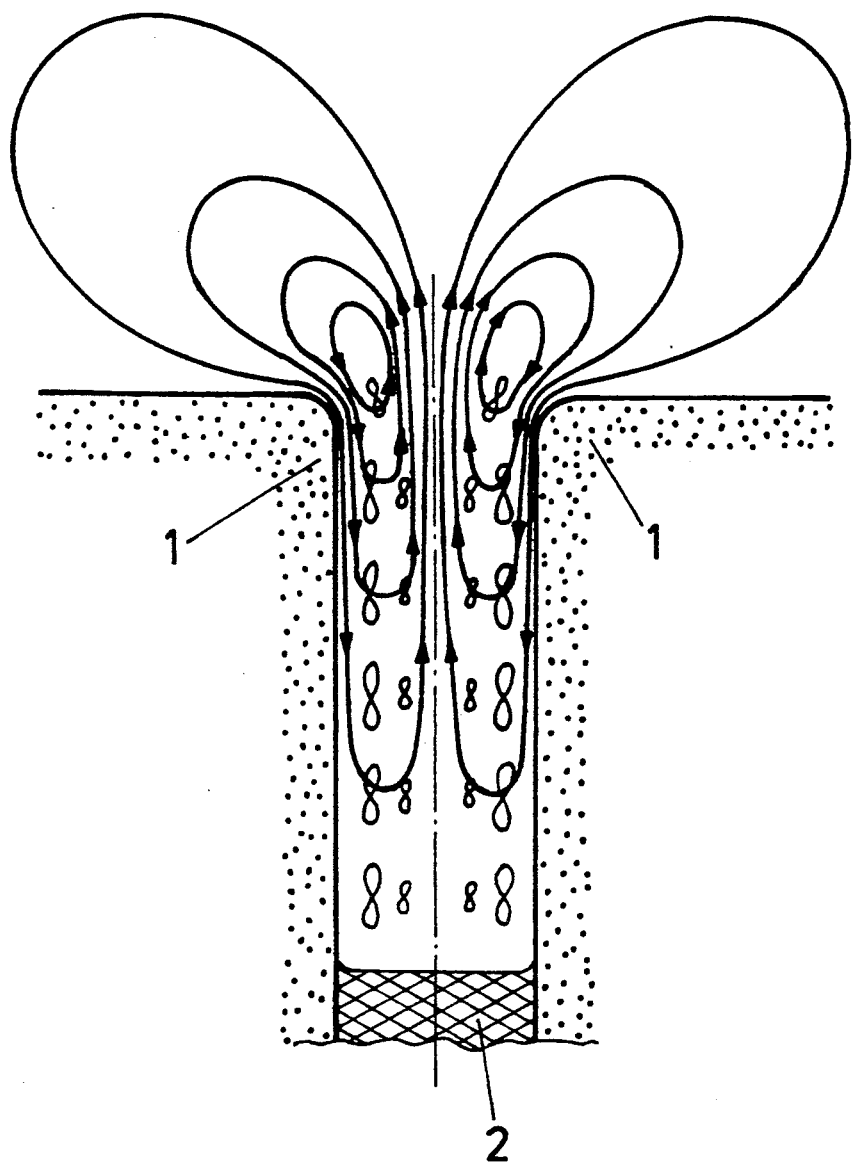
FIG. 1 shows in schematised form the bath agitations, brought about by electromagnet forces, in the region above the bottom electrode.

FIG. 1 illustrates the region of the vessel bottom, lined with refractory material 1, of a direct-current arc furnace having a bottom electrode 2. The bottom electrode 1 originally passing through the entire vessel bottom has been partly consumed. The space above is filled with a mixture of molten electrode material and furnace melt. The bath agitation, which arises under the influence of the furnace current, is indicated by arrows. It can be seen that the bath agitation weakens with increasing depth. A state of equilibrium is established, dependent upon the current density in the bottom electrode and cooling from outside (below).

Figure 2:
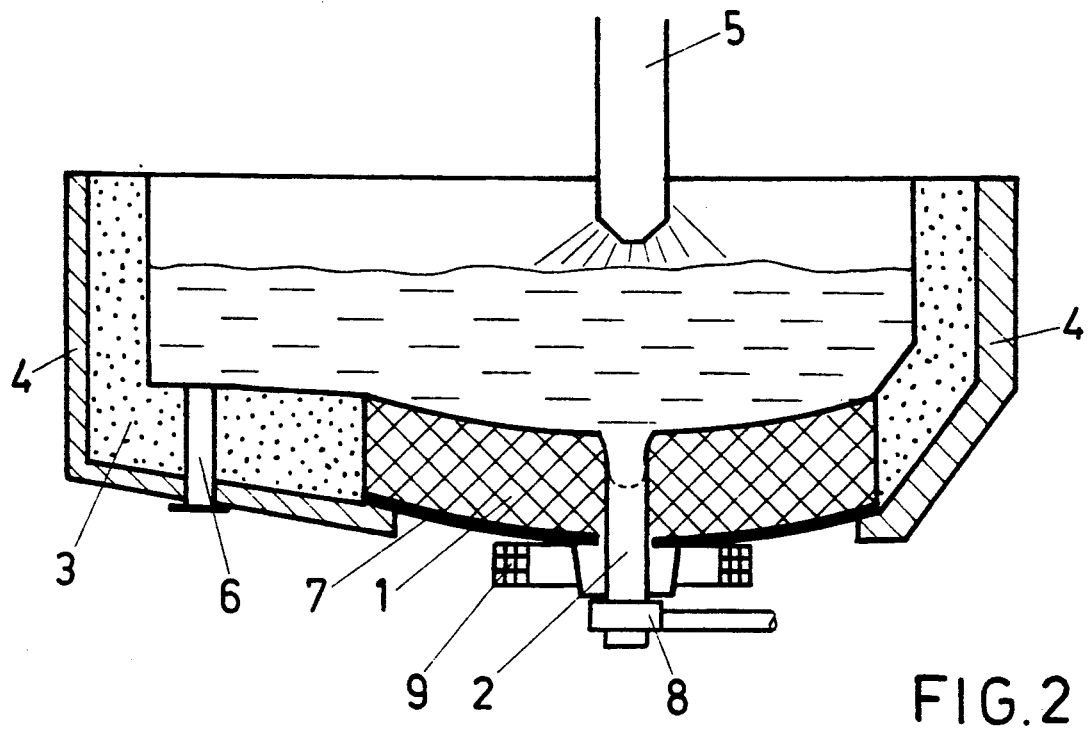
FIG. 2 shows an exemplary embodiment of a direct-current arc furnace having an electromagnet on the vessel bottom.

FIG. 2 illustrates the way in which the invention is realised in a direct-current arc furnace. It shows the lower furnace of a direct-current arc furnace having a furnace vessel 3, which is provided with the customary shell 4 made of metallic material. In the exemplary embodiment, the furnace has only one electrode 5, connected as the cathode, but this number may also be 2, three or more. The bottom electrode 2 is fitted in the base of the furnace. In this particular example it is composed of steel having a similar composition to the melt. The bottom taphole is designated by 6. Adjoining this towards the outside is the conventional furnace lining 1. It consists as a rule of bricks which rest in one or more layers on a bottom plate 7 shaped like a spherical cap. The bottom electrode 2 is provided at its lower end with a supply terminal 8, which can be utilised at the same time for cooling the bottom electrode 2.

To this extent the direct-current arc furnace corresponds to the prior art and is described in detail, for example, in U.S. Pat. No. 4,228,314 and also in German Patent Specification 30 22 566.

According to the invention, an electromagnet 9, which surrounds the bottom electrode 2, is provided on the underside of the furnace bottom 7. In this arrangement, a field strength ranging from 0.05 to 0.2 tesla has proved sufficient to damp sufficiently the bath agitations above the bottom electrode. In a typical 80-tonne direct-current arc furnace with a furnace diameter of about 5.5 m, the diameter of the electromagnet is about 2 m. With a current density of, for example, $5A/mm^2$, the (sic) weight of the electromagnet is approximately 4000 kg and the electrical losses are approximately 200 kW, an acceptable value considering that the power requirement of a direct-current arc furnace of this type is around 65 MVA; consequently, the power requirement of the entire plant increases only by approximately 0.3%.

Figure 3:
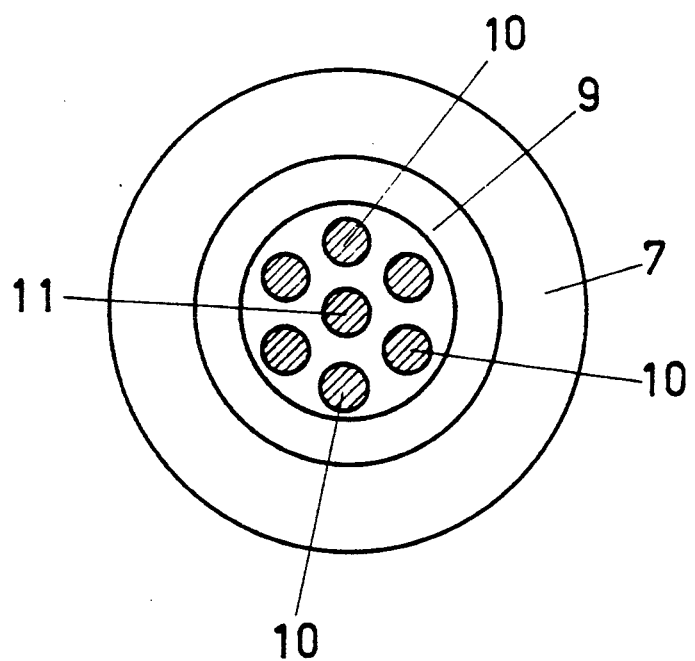
FIG. 3 shows a simplified plan view of furnace vessel bottom having a bottom electrode, consisting of seven individual electrodes, in the central region of the bottom of the furnace, to which individual electrodes a common electromagnet is assigned.

Instead of a single bottom electrode 2, a multiplicity of individual electrodes can be employed, as shown schematically in FIG. 3. These individual electrodes are located in the central region of the bottom plate 7. In this particular example, six individual electrodes 10 are grouped around a central electrode 11, all the electrodes being located inside the electromagnet 9.

The design of the bottom region of the furnace vessel can be simplified in the case of a multielectrode arrangement by designing the individual electrodes in accordance with FIG. 4. The 7 individual electrodes 10, 11 are, in contrast to the embodiment according to FIG. 3, not embedded directly into the refractory material 1 of the furnace bottom, but are surrounded by hexagonal shaped bodies 12, with the cross-section of a regular hexagon, made of a refractory material, for example magnesite, magnesite-graphite or another suitable material. For reasons of manufacturing simplicity, the shaped bodies 12 are constructed in two parts, the parting planes extending symmetrically (either diagonally (from top to bottom as depicted) or along the dashed line in FIG. 4). This geometry enables this structure to be densely packed. Instead of the hexagonal form, it is of course also possible to use another geometry, for example with square cross-section (cf. FIG. 4a). The bottom electrode may also be formed from more than seven individual electrodes, for example 13. Of course, it is also possible to install an individual bottom electrode with the geometry in accordance with FIG. 4 in a direct-current arc furnace in accordance with FIG. 2.

In the current-supply equipment of direct-current arc furnace chokes are always employed for smoothing the rectified three-phase current. The invention now offers an extremely economical possibility here of using these chokes, which are necessary in any case, for damping the bath agitation.

The circuit arrangement according to FIG. 5 shows this for a 12-pulse rectifier arrangement. Connected to a three-phase network 13 is a transformer 14 having two primary windings 15, 16, which are delta-connected, and two secondary windings 17, 18, one of which is delta-connected and the other star-connected. Both secondary windings lead to a three-phase rectifier bridge circuit 19 and 20 respectively. The negative busbars are connected to one another and lead to the melting electrode 5. Located between each positive busbar of the bridge circuits 19 and 20 and of the bottom electrode 2 is a choke 9a and 9b respectively. According to the invention, these two chokes now form the electromagnet consisting here of two coils, the connections and winding direction of the coils naturally being so disposed that these part-magnets are connected magnetically in parallel. In a six-pulse rectifier circuit the windings 15, 17 or 16, 18 of the transformer 14 and accordingly one of the bridges 19 and 20 respectively and also one of the chokes 9a and 9b respectively were dispensed with.

I claim:

1. A direct-current arc furnace having at least one bottom electrode mounted in a furnace vessel and defining a longitudinal axis, and means for producing a bath agitation by means of an electromagnet through which an essentially direct current is passed to produce lines of flux, wherein said electromagnet is provided directly on the underside of the furnace vessel on a furnace bottom and encloses the at least one bottom electrode, and the lines of flux of the electromagnet run essentially in the longitudinal axis of the at least one bottom electrode.

2. Direct-current arc furnace according to claim 1, comprising a furnace supply having rectifier busbars for supplying power to said at least one electrode, wherein the electromagnet has furnace current passing through it and is additionally at the same time acting as a choke in a direct-current branch of the furnace supply.

3. Direct-current arc furnace according to claim 2, wherein the furnace supply includes a twelve-pulse rectifier arrangement and the electromagnet is divided up into two part-magnets, which part-magnets are each located between said rectifier busbars and the at least one bottom electrode and are connected in such a way that both magnets are connected magnetically in parallel.

4. Direct-current arc furnace according to claim 3, comprising a multiplicity of individual bottom electrodes which are connected electrically in parallel.

5. Direct-current arc furnace according to claim 4, wherein the individual bottom electrodes each consists of a metal core and a shaped body with a regular cross-section which surrounds the core.

6. Direct-current arc furnace according to claim 5, wherein each shaped body is divided in a longitudinal direction of the electrode which it surrounds and consists of two symmetrical shaped body halves.

* * * * *